United States Patent [19]

Tang et al.

[11] 3,909,751

[45] Sept. 30, 1975

[54] MICROWAVE SWITCH AND SHIFTER INCLUDING A BISTATE CAPACITOR

[75] Inventors: Raymond Tang, Fullerton; Richard W. Burns, Orange; Russell L. Holden, Fullerton, all of Calif.

[73] Assignee: Hughes Aircraft Company, Culver City, Calif.

[22] Filed: Dec. 28, 1973

[21] Appl. No.: 419,751

[52] U.S. Cl............... 333/7 D; 333/31 R; 333/97 S; 307/320

[51] Int. Cl.$^2$........................ H01P 1/15; H01P 1/18

[58] Field of Search...... 307/256, 320; 317/234 UA; 333/7 D, 31 R, 97 S

[56] References Cited

UNITED STATES PATENTS

| | | | |
|---|---|---|---|
| 3,337,820 | 8/1967 | Harper | 333/7 D |
| 3,475,700 | 10/1969 | Ertel | 333/7 D |
| 3,491,314 | 1/1970 | White | 333/31 R |
| 3,503,014 | 3/1970 | Hall et al. | 333/7 D |
| 3,538,465 | 11/1970 | Manning, Jr. et al. | 333/7 D X |
| 3,648,340 | 3/1972 | MacIver | 317/234 UA X |
| 3,750,055 | 7/1973 | Funck | 333/7 D X |
| 3,808,472 | 4/1974 | Engeler | 317/234 UA X |

OTHER PUBLICATIONS

Adam, *Junction Capacitance Switches*, IEEE Trans. on ED, 1/63, pp. 51–58.

*Primary Examiner*—Paul L. Gensler
*Attorney, Agent, or Firm*—William J. Bethurum; W. H. MacAllister

[57] ABSTRACT

Disclosed is a network for switching microwave signals on a transmission line or waveguide and for shifting the phase of same by introducing a time delay into the signals. The network includes, for example, a two wire transmission line or waveguide on which the signals are propagated and a bistate voltage variable capacitor (varactor) connected across the line at a selected location thereon. The bistate capacitor may be controllably biased along a partially linear slope of its capacitance-voltage (CV) characteristic between one substantially constant value of capacitance to another. Advantageously, the bistate capacitor may be driven directly from low power digital logic circuitry and this feature is made possible by the fact that, at all times during switching, the bistate capacitor is either zero biased or reversed biased and consumes negligible current and power in both of its two substantially constant capacitance states. A unique feature of this network is that the switching or phase shifting of the microwave signal is accomplished with negligible control power. Hence, this network can be controlled directly from a computer's output without the requirement for any additional control networks and power supplies. Therefore, the application of this network is a phased array radar system greatly reduces the cost of such systems.

12 Claims, 9 Drawing Figures

MICROWAVE SWITCH AND SHIFTER INCLUDING A BISTATE CAPACITOR

FIELD OF THE INVENTION

This invention relates generally to microwave switching circuitry and more particularly to bistate varactor circuitry for switching and shifting the phase of microwave signals.

BACKGROUND

In recent years, the introduction of large, phased array antennas employing thousands of identical electronic switching components has brought about the use of corresponding large numbers of microwave switching diodes in order to achieve a desired level of economy and reliability in the switching of microwave signals. Switching networks utilizing these microwave diodes are now widely used in radar systems to route signals along different paths where they can be appropriately modified by attentuators, amplifiers, phase shifters, and the like. The fundamental switching element of these networks is usually a semiconductor diode which is controllably biased to approximate either an open circuit or a short circuit, depending upon whether the diode is reverse or forward biased. This biasing technique is used, for example, in the steering of radar beams, and the later may be accomplished by controlling the phase of large numbers of antennae elements to which these diode switching networks are connected. Such steering has made it possible to track multiple targets simultaneously and to rapidly move a radar beam through large angles in contrast to the slow movements of mechanically steered parabolic reflector type antennas.

Diode phase shift networkds, which are within the broad field of microwave switching networks, are frequently connected, for example, in series with each radiator of a phased array antenna, and the radiated beam direction (phase front direction) from the array can be controlled by varying the time delay from the source of a common signal to each element of the array. Diode phase shift networks are also frequently connected in series with transmission lines of different lengths; and a time delay is introduced into the transmitted signals by switching the signals along these different paths of the transmission line.

PRIOR ART

Hitherto, semiconductor phase shifters and switches have normally used either a varactor diode or a PIN diode as the basic control element for switching and shifting the phase of microwave signals. The sue of state-of-the-art varactor diodes in this manner has been limited to phase shifting operation at relatively low power levels, and the non-linear capacitance-voltage (C-V) characteristic of varacter diodes introduces substantial modulation distortion into the switched microwave signals. That is, all of prior art varactor diode-type phase shifters known to us employ diodes which do not have two substantially constant capacitance values or "plateaus" which corresponds to two separate ranges of applied bias voltage.

On the other hand, there are PIN diodes commercially available which do have a C-V characteristic such that these diodes can be switched between two substantially constant values of capacitance. Such PIN devices are useful for phase shifting microwave signals at power levels into the kilowatt range. However, for proper operation, the PIN diode requires two bias levels of opposite polarity. In one bias state, the PIN diode conducts about one hundred milliamperes of current at +1.0 volt and in the opposite state it conducts about one microampere of current at −100 volts. In large phased array antennas using thousands of these PIN diode elements, the total bias power required can be as high as 20 kilowatts. As a result of this substantial drive power requirement, the cost of the driver circuits for these PIN diodes can run approximately one-third of the total cost of the phased array antenna system.

THE INVENTION

The general purpose of this invention is to provide a novel alternative approach to the above prior art varactor diode and PIN diode microwave switching and phase shifting techniques, and one which possesses most, if not all, of the advantages of these prior techniques while possessing none of their significant disadvantages. To attain this purpose, we have provided, in novel combination, a transmission line along which microwave signals are propagated and one or more voltage responsive bistate capacitors connected in shunt across this line at selected locations thereon. These capacitors are operative to controllably switch and thereby shift the phase of microwave signals as the capacitors are biased from one to another of their two substantially constant capacitance states. The term "capacitance state" refers to a substantially constant level of capacitance which will not significantly vary over a given range of applied bias voltage. The bistate capacitor is either zero biased or reverse biased in its respective capacitance states, and as a result of its corresponding neligible power consumption, each bistate capacitor may advantageously be directly driven by low power and low voltage logic circuits. This feature eliminates the necessity for using complex and high power level diode drivers. In one embodiment of the invention, the bistate capacitor is an MOS semiconductor device which is operatively switched from zero bias to some discrete level of reverse bias, with each bias condition requiring no or negligible bias current to flow through the MOS device. The MOS device is operatively biased between two substantially constant values of capacitance, a characteristic heretofore unknown to us in the prior art related to microwave varactor phase shifters and switches. The C-V characteristic of this MOS bistate capacitor is frequency independent up to about 4.0 GHz.

Accordingly, an object of the present invention is to provide a novel low power and low distortion microwave switching network.

Another object is to provide a new and improved voltage variable bistate capacitor microwave phase shifter.

Another object of the invention is to provide a microwave switch and phase shifter of the type described which is low in cost, reliable and durable in operation, and which requires relatively low power and voltage levels for its switching operation.

A further object of this invention is to provide a microwave phase shifter and switch of the type described which is particularly adapted for the phase shift control of signals propagated along either a waveguide or a coaxial, a stripline or a microstrip transmission line.

A feature of this invention is the provision of a varactor (voltage variable capacitor) network which may be biased along a linear (or partially linear) slope of its capacitance-voltage (C-V) characteristic and between two substantially constant values of capacitance. Each capacitance state corresponds to a predetermined range of bias voltage and requires neglible current and power drain.

DRAWINGS

Figure 1:
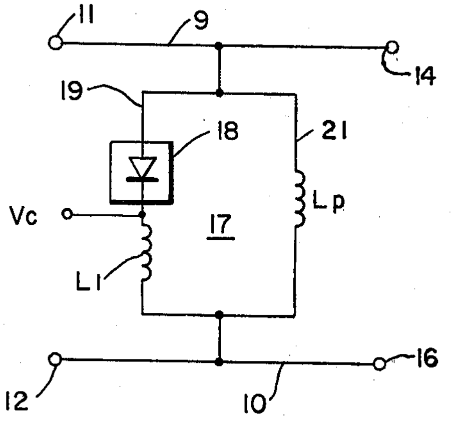
FIG. 1 is a schematic diagram illustrating a zero mode switching circuit embodying the invention.
Figure 2:
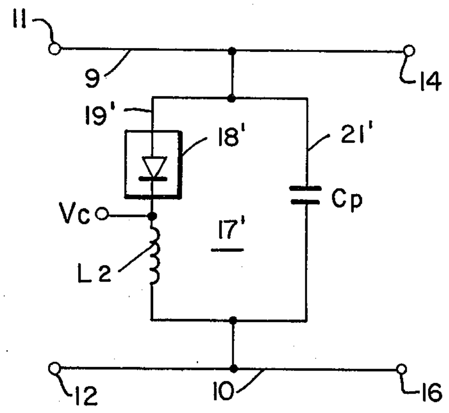
FIG. 2 is a schematic diagram of a reverse mode switching circuit embodying the invention.
Figure 4:
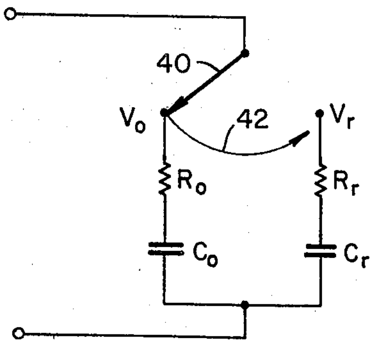

FIG. 4 is an electrical equivalent circuit for the bistate capacitors 18 and 18' in FIGS. 1 and 2, respectvely;

FIG. *5a* is a diagrammatic cross-section view of an MOS type bistate capacitor which has been used in practicing the invention;

FIG. *5b* is an equivalent circuit for the MOS capacitor in FIG. *5a;*

Figure 6:
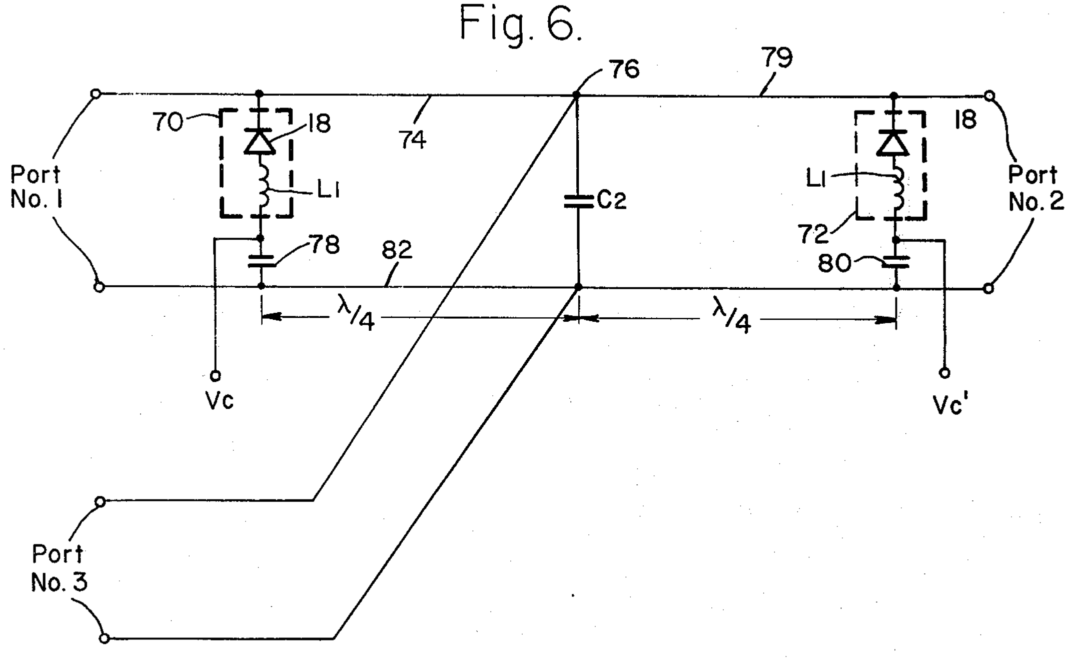
Figure 8:
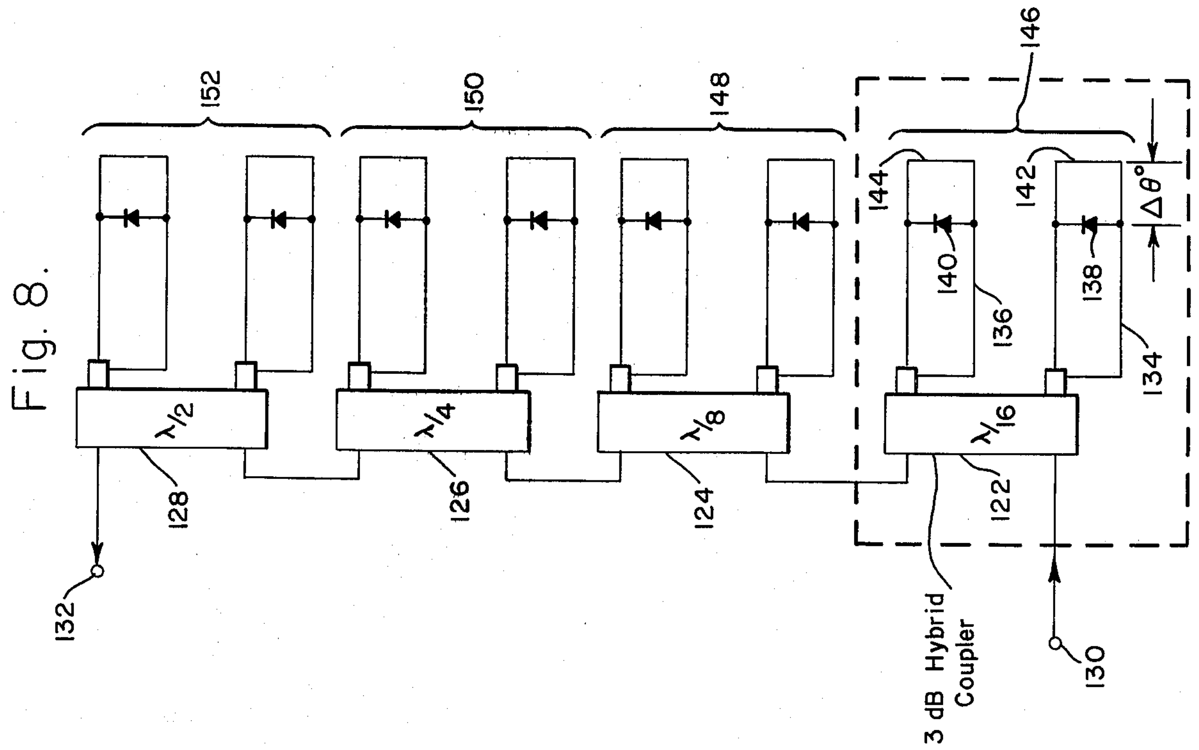
Figure 7:
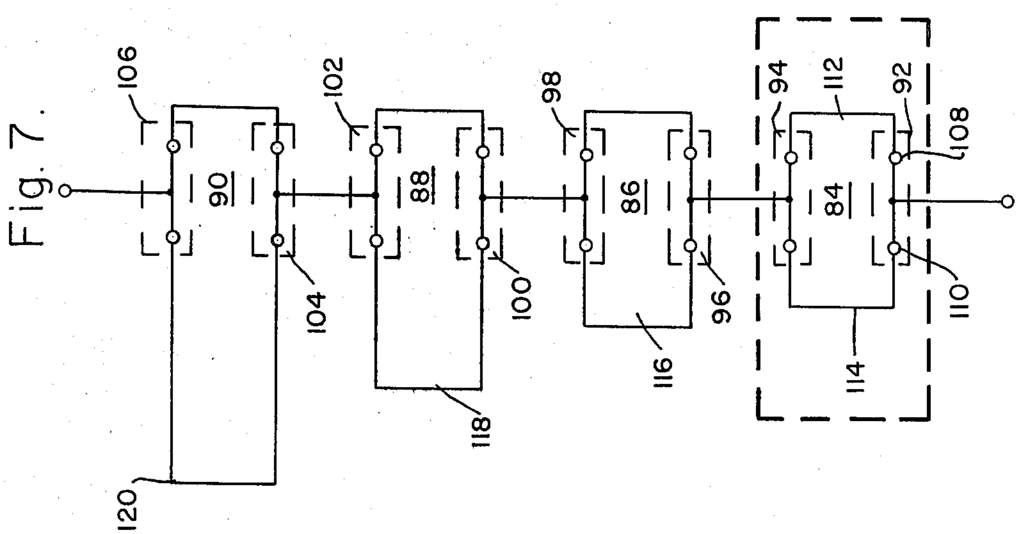

FIG. 6 illustrates a single pole double throw microwave switch embodying the principles of the present invention and utilizing the circuits in either FIG. 1 or FIG. 2;

FIG. 7 is a 4-bis switched line microwave phase shifter in which the switching circuitry of FIG. 6 is employed; and FIG. 8 is a 4-bit hybrid coupled phase shifter utilizing either the zero mode or the reverse mode circuits illustrated in FIGS. 1 and 2.

DETAILED DESCRIPTION

Referring now to FIG. 1, there is shown a two-wire transmission line 9, 10 extending between input ports 11 and 12 and output ports 14 and 16; and a variable impedance network 17 is connected as shown across this two-wire transmission line. The network 17 is connected to receive a control voltage, $V_C$, as shown and is operative in response to this control voltage to act either as a short circuit or as an open circuit to either shunt microwave signals through the variable impedance network 17 or to allow the signals to pass from input ports 11, 12 to output ports 14, 16. The variable impedance network 17 includes a bistate capacitor 18 and an inductor $L_1$ connected in one of its parallel paths 19, and it further includes an inductor $L_p$ connected in its other parallel path 21. In the following description of operation of the zero mode circuit in FIG. 1, as well as in the subsequent description of the reverse mode circuit in FIG. 2, reference should be made to the capacitance and resistance-versus-voltage characteristics illustrated in FIG. 3.

In the zero mode circuit of FIG. 1, the leg 19 of the variable reactance network 17 will be substantially a short circuit if $L_1$ and the bistate capacitor 18 are at series resonance at the RF frequency impressed on the network 17. The latter may be accomplished by selecting $L_1$ so that its inductive reactance $L_1$ is equal to the capacitive reactance $C_{18}$ of capacitor 18 at this RF frequency and for zero bias on capacitor 18. The capacitance of capacitor 18 is given in FIG. 3 as $C_o$. When the voltage $V_C$ is increased to reverse bias the capacitor 18 off series resonance, then an open circuit for the network 17 is obtained by removing the above series resonant condition in leg 19 and by simultaneously reverse biasing the capacitor 18 to parallel resonance with the shunt inductance $L_P$. The capacitance of capacitor 18 is now $C_r$ as noted in FIG. 3.

Figure 3:
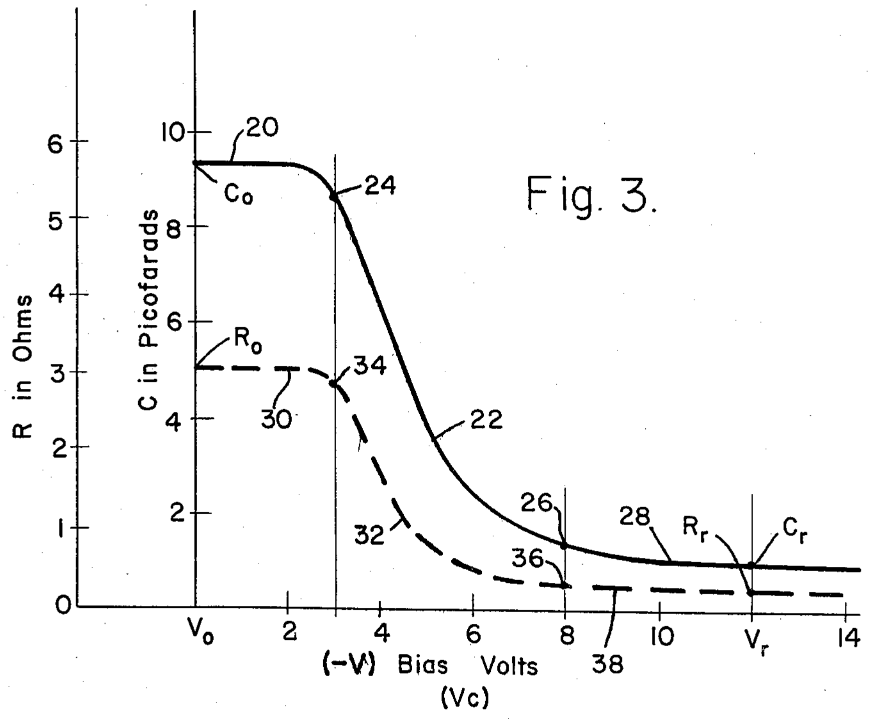
FIG. 3 is a graph illustrating the capacitance and resistance-versus-voltage characteristics for both the zero and reverse mode circuits in FIGS. 1 and 2, respectively.

The reverse mode switch in FIG. 2 is operative to provide an RF short circuit condition with a reverse bias voltage $V_C$ impressed on capacitor 18'. This voltage reverse biases the capacitor 18' to a value of capacitance $C_r$ which is series resonant with the inductor $L_2$ at the impressed RF frequency. An open cirucit condition for the variable impedenace network 17' is obtained by changing the value of $V_C$ so that it now biases capacitor 18' to $C_o$ at zero bias, whereupon the inductance $L_2$ and shunt capancitance $C_P$ become parallel resonant at the impressed RF frequency. Thus, the two networks 17 and 17' may both be operated at RF short or RF open circuit for either the zero bias condition or the reverse bias condition for the bistate capacitor. The circuits in FIGS. 1 and 2 provide the necessary flexibility for the bistate capacitor 18, 18' in its use as a microwave switch to either shunt microwave signals through the variable reactance networks 17, 17', or to allow the signals to pass from input ports 11, 12 to output ports, 14, 16. In each of these circuits, the values of resistance and capacitance of the bistate capacitors 18, 18' will vary with the applied bias voltage $V_C$ as indicated in FIG. 3. In FIG. 3, $C_o$ and $R_o$ represent the bistate capacitor's capacitance and resistance at zero bias $V_o$, whereas $C_r$ and $R_r$ represent its capacitance and resistance at a reverse bias, $V_r$.

Referring now to FIG. 3 in detail, the capacitanceversus-voltage characteristic of the bistate capacitor 18 or 18' includes a high capacitance region 20 which is associated with low values of reverse bias voltage where the capacitors'depletion region is very narrow. This C-V characteristic further includes a partially linear slope portion 22 which extends as shown between points 24 and 26 in the capacitance transition region to a second, substantially lower capacitance region 28 for voltages in the vicinity of a chosen reverse voltage $V_r$ applied as the control voltage $V_C$ to the capacitor 18 or 18'.

The internal resistance of the bistate capacitor 18 or 18' is also dependent upon the applied bias voltage $V_C$ and includes a relatively high resistance region 30 in the vicinity of $V_O$, followed by a transistion region 32 which extends between points 34 and 36 as shown to a relatively low and substantially constant resistance region 38. Thus, by switching the control voltage $V_C$ from a value $V_O$ to a higher negative value $V_r$, the switch 40 in FIG. 4 (representing the specific equivalent electrical circuit of either capacitor 18 or 18') is moved from its position shown and in the direction of the arrow 42 to disconnect $R_O$ and $C_O$ and in turn connect $R_r$ and $C_r$ in leg 19 or 19' of the variable impedance network 17, 17' respectively.

It can be shown that the cutoff frequency, $f_{co}$, and thus the RF performance of either the zero mode or the reverse mode switches in FIGS. 1 and 2 are directly related to the parameters of the bistate capacitor 18 in accordance with the expression:

$$f_{co} = \frac{1}{2\pi \cdot \left[\frac{C_o C_r}{C_o - C_r}\right] \cdot \sqrt{R_o \cdot R_r}}$$

$C_o$ = Zero Bias Capacitance for capacitor 18 or 18',
$C_r$ = Reverse Bias Capacitance for 18 or 18',
i $R_o$ = Zero Bias Series Resistance for 18 or 18' and
$R_r$ = Reverse Bias Series Resistance of capacitor 18 or 18'.

Figure 5B:
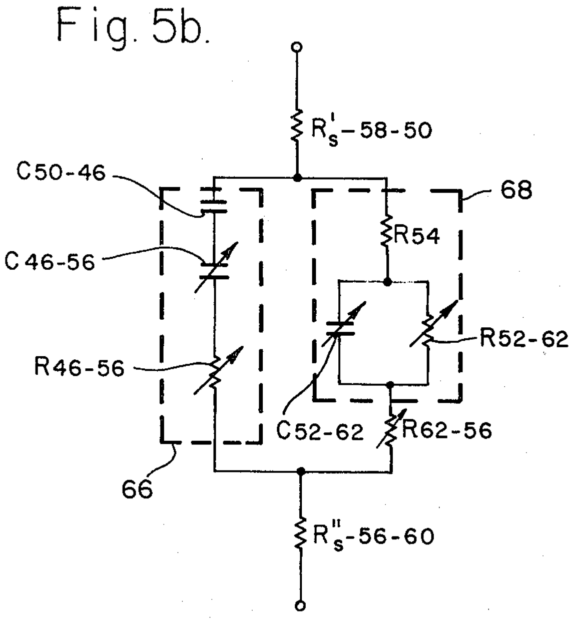
Figure 5A:
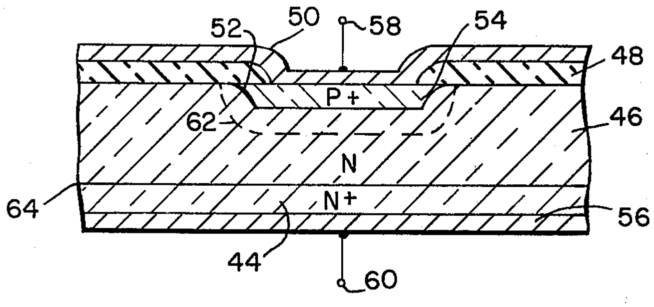

Referring now to FIGS. 5*a* and 5*b*, there is shown in diagrammatic cross section an MOS capacitor which has been used as the capacitor 18 or 18' in the circuits of FIGS. 1 and 2 and operated at frequencies in the range of 0.1 to 4.0 GHz. This bistate MOS capactor includes an N+ substrate 44 upon which an N type epitaxial layer 46 is deposited using well-known epitaxial deposition techniques. A P+ region 54 is formed either by diffusion or ion implantation through a central opening in an oxide mask 48 and all of the above steps may be carried out using well-known and conventional silicon planar processing techniques. The oxide mask 48 serves to passivate the PN junction 52 of the structure at its point of surface termination, and it further serves to receive and to securely adhere to an overlay metallization layer 50 for making ohmic contact to the P+ region 54. A backside metallization layer 56 may be simultaneously deposited with the deposition (evaporation) of the top contact 50 and thereafter external electrical connections 58 and 60 may be made to the MOS bistate capacitor 18 using conventional wire bonding techniques.

The bistate capacitor in FIG. 5*a* has a depletion layer boundary 62 as shown which moves toward the N-$N^+$ junction 64 of the MOS structure as the reverse voltage on terminals 58 and 60 is increased. This variation serves to change the PN junction capacitance of the device which is, of course, inversely proportional to the width of the depletion layer of the device. In addition to this PN junction capacitance, the MOS structure in FIG. 5*a* includes a parallel connected MOS capacitance defined by metallization 50 (one plate), the $SiO_2$ oxide layer 48 (the dielectric), and the remaining underlying silicon and metal material which serve as the other plate of the MOS capacitor.

The equivalent circuit of the MOS structure, including its two parallel connected capacitors, is illustrated in FIG. 5*b* and includes an MOS capacitance and resistance network 66 connected in parallel with a variable PN junction resistance-capacitance network 68. This equivalent circuit is related to the MOS structure in FIG. 5*a*, in the following manner: $R_S'$ is the series resistance between the top contact 58 and the top layer of metallization 50, and $R_S''$ is the series resistance between the bottom layer of metallization 56 and the bottom contact 60. For the PN junction equivalent network 68, R is the ohmic resistance of the P+ region 54, and C and R are the parallel capacitance and resistance between the Pn junction 52 and the lower edge 62 of the depletion layer. The variable resistor R represents the resistance between the depletion layer 62 and the metallization layer 56. In the MOS capacitor equivalent network 66, the fixed capacitor C appears between the top metallization layer 50 and the undepleted region 46. The variable capacitor C is the capacitance of the region 46 between the oxide layer 48 and the backside contact layer 56; and the variable resistor R is the resistance of the last defined region between region 46 and contact layer 56.

The MOS capacitor per se illustrated in FIGS. 5*a* and 5*b* was fabricated at our request by the Siliconix Co. of Sunnyvale, Ca., and given a Siliconix model designation FB1854. This bistate capacitor was especially developed for our assignee, Hughes Aircraft Company, under a Hughes Aircraft Company design specification. The specific bistate capacitance-voltage (C-V) characteristic (FIG. 3) for this device was measured at 1 GHz and exhibited by a capacitance transistion region 22 extending from approximately −3 volts at point 24 to approximately −7 volts at point 26. The zero bias resistance for this MOS device was approximately 3 ohms and its capacitance at zero bias was approximately 10 picafarads. Its capacitance at a reverse bias voltage of −14 volts was about 1 picofarad, and its resistance at this level of reverse bias was approximately 0.3 ohms.

Referring now to FIG. 6, the switches designated 70 and 72 therein both utilize a bistate capacitor 18 and a serirs inductor $L_1$ operated in the zero mode as previously described. The operation of this network is as follows: Assume that switch 70 is biased by $V_c$ to the RF short or low impedance state, with the capacitance of 18 and the inductance of $L_1$ in switch 70 being series resonant. This RF short or low impedance state is transformed by the quarter wavelength of line 74 to a high impedance at node 76 and across the capacitor $C_2$. This high impedance condition presents negligible loading to an RF signal entering port 3. Simultaneously, the switch 72 in port no. 2 is biased by $V_c'$ so that the capacitor 18 and the inductor $L_1$ therein are biased to an anti-resonant condition. Furthermore, the capacitor $C_2$ is transformed by the quarter wavelength of line 79 so that it now becomes effectively a shunt inductance across the reverse biased switch 72, and thus becomes parallel resonant with the capacitance of the bistate capacitor 18 therein. The latter, of course, is an RF open circuit condition, so that the RF energy received at port no. 3 will be switched from node 76 and out of port no. 2 with very little attenuation. In a similar manner, if the bias levels of $V_c'$ and $V_c$ respectively, are reversed, the RF signal will now be routed from port no. 3 to port no. 1.

The capacitors 78 and 80 serve to decouple the bias voltages $V_c$ and $V_c'$ from the line 82.

The switching circuitry illustrated in FIG. 6 finds a useful application in the 4-bit switched line phase shifter of FIG. 7, wherein each of the four stages 84, 86, 88 and 90 utilize two microwave switches e.g. 92 and 94 of the type shown in FIG. 6. The switches are designated 92, 94, 96, 98, 100, 102, 104, and 106, respectively, and each of these latter switches includes a pair of variable impedance networks, e.g. 108 and 110, which are identical to the switches 70 and 72 in FIG. 6. One of these switches 108 in each stage, e.g. 84, is connected in a transmission line 112 of a chosen length and the other of these networks 110 is connected in a longer parallel transmission path 114. The signals switched along the longer path length 114 will be delayed with respect to those switched along the shorter path length 112, and this delay may, or course, be increased if desired by appropriately switching the signals along the longer path lengths 116, 118 and 120 in the successive stages 86, and 88 and 90.

Referring now to FIG. 8, there is shown a 4-bit hybird coupled phase shifter including four series connected 3dB hybrid couplers 122, 124, 126 and 1;28 respectively. These couplers are connected as shown between input and output terminals 130 and 132, and each of the hybrid couplers e.g., 122, is connected as shown to a pair of balanced phase switches 134 and 136. These switches may take the form of either waveguide stubs or transmission lines of predetermined length. Each of these balance phase switches includes a bi-state capacitor 138 and 140 connected as shown a predetermined phased delay $\Delta\theta$ from the respective terminations 142 and 144 of the two balanced phase switches.

If the two-bi-state capacitors 138 and 140 are biased to appear as open circuits, then the microwave signals propagated down switches 134 and 136 will undergo no net phase shift and will produce no net phase change between the input and the output of the 3dB hybrid coupler 122. On the other hand, if the two bi-state capacitors 138 and 140 are biased to a short circuit condition, then each switch 134 and 136 will introduce a contributing phase shift of $\Delta\theta°$ into the signal passing through the 3dB coupler 122, resulting in a total phase shift of $2\Delta\theta°$. Of course, the spacing between the bi-state capacitors 138 and 140 and the terminations 142 and 144 may be varied to in turn vary the amount of phase shift introduced by each balanced Phase switch 134 and 136. Thus, the first phase bit 146 of the phase shifter in FIG. 8 may have its varactors 138 and 140 positioned so as to introduce a total phase change of $\pi/16$ into the microwave signal passing through the first 3dB hybird coupler 122. The next bit 148 of the phase shifter is adjusted to introduce a phase change of $\pi/8$ into the signal received from coupler 122, whereas the next two bits 150 and 152 are adjusted so that, when properly switched by a control signal to the bi-state capacitors therein they will introduce phase changes respectively of $\pi/4$ and $\pi/2$ into the signals passing through the respective 3dB hybird couplers 126 and 128. Thus, by appropriately biasing of any one or a combination of the phase bits 146, 148, 150 and 152, a predetermined phase delay may be introduced into the microwave signal passing between input and output terminals 130 and 132 of the circuitry in FIG. 8.

The internal construction of the 3dB hybird couplers e.g. 122, is well known in the art and will therefore not be described in further detail herein. However, for a further discussion of hybird coupled phase shifters (e.g. FIG. 8) or switched line phase shifters (e.g. FIG. 7), reference may be made to a textbook authored by H. A. Watson entitled, *Microwave Semiconductor Devices and Their Circuit Applications*, *McGraw-Hill*, *Inc*., 1969, pg. 327 et seq.

It should be understood that the microwave circuit techniques illustrated in FIGS. 7 and 8 represent only two of many useful applications for the bi-state capacitor-phase shifter according to the present invention. These applications should in no way be construed as limiting the scope of the other many applications to which the present invention may be useful. For example, another application for the present invention is an analog phase shifter which, in the past, has used the variable capacitance characteristic of a conventional varactor diode in order to provide the appropriate phase shift.

Yet another application for the present invention resides in circuitry for providing a non-linear voltage-capacitance characteristic required by parametric amplifiers and converters where 2 RF signals of a different frequency are applied to either amplify and/or upconvert one of the signals. Another application of the present invention is in varactor type tuning, wherein the resonant frequency of a circuit may be changed with a change in voltage applied to the bi-state capacitor. The large capacitance change obtained by applying only a relatively small change in control voltage makes the bi-state capacitor particularly useful for this application. Still another application for the present invention resides in its use as a fast acting passive limiter which may be used as a radar receiver protector. Two shunt opposed bi-state capacitors which are appropriately mounted across a line and biased slightly more negative than the transition voltage will effectively clip high power input signals and thereby limt the amount of power passing the diodes.

What is claimed is:

1. A microwave switching network including, in combination:

a. a pair of conductors for receiving and propagating microwave signals, b. a variable impedance signal path connected between said conductors and switchable between open circuit and short circuit conditions to either allow microwave signals to bypass said path or be shorted therethrough, said path including c. a voltage responsive variable capacitance device having two capacitance states for which the device capacitance is substantially invariant in separate predetermined voltage ranges and which is either zero biased or reverse biased in said ranges, and d. said variable impedance signal path further including an inductor connected in series with said bistate capacitor and having a value such that it is series resonant with said bistate capacitor when the latter is biased to one of its two substantially constant capacitance states, whereby the switching of said inductor and capacitor on and off series resonance controls the short circuit and open circuit conditions of said variable impedance signal path, and the power required for switching said network and the distortion introduced into said microwave signals during switching are minimized.

2. The network defined in claim 1 wherein an inductor is connected in parallel with said bistate capacitor and is operative to resonate in parallel resonance with said bistate capacitor at the other of the two capacitance states of said bistate capacitor.

3. The network defined in claim 1 which includes a capacitance connected in parallel with said bistate capacitor and inductor and operative to resonate in parallel resonance with said inductor at the other of the two capacitance states of said bistate capacitor.

4. A microwave switching network including, in combination:

a. signal transmission means including at least two conductors for receiving and propagating microwave signals, b. a variable impedance signal path connected between said conductors and switchable between a substantially open circuit condition to a substantially short circuit condition to either allow microwave signals to bypass said path or to be shorted therethrough, c. a bistate voltage responsive capacitor connected in said variable impedance signal path and responsive to a control voltage for switching from one to another of two substantially constant values of capacitance corresponding to predetermined ranges of control voltage, said capacitor having a capacitance-vs-voltage characteristic which includes one substanially constant high capacitance range corresponding to a relatively low range of control voltages, a capacitance transition region for a somewhat higher range of control voltages, followed by a second, substantially lower and constant capacitance value corresponding to a still higher range of control voltages, and d. said variable impedance signal path includes an inductor connected in series with said bistate capacitor and having a value such that it is series resonant with said bistate capacitor when the latter is biased to one of its two substantially constant capacitance states, whereby the switching of said inductor and capacitor on and off series resonance controls the short circuit and open circuit conditions of said variable impedance signal path, and said bistate capacitor conducts negligible current in either state of substantially capacitance and thereby requires a minimum power of switching said network.

5. The network defined in claim 4 wherein said variable impedance signal path further includes an inductor connected in parallel with said bistate capacitor and said first named inductor aand operative to be parallel resonant with said capacitor when the latter is biased off series resonance with the series inductor connected thereto to thereby approximate a high impedance open circuit condition for said variable impedance signal path.

6. The network defined in claim 4 wherein said variable impedance signal path further includes a constant value capacitor connected in parallel with both said bistate capacitor and said inductor and is operative to resonate in parallel with said inductor to thereby establish a substantially open circuit condition for said variable impedance signal path when said bistate capacitor is biased off series resonance with said inductor connected thereto.

7. A microwave switching network for introducing a phase delay into microwave signals propagated down a first transmission line by switching said signals thereon either to a second or to a third transmission line, both of which lines are commonly joined to said first transmission line; said network including in combination:

a. a first variable impedance signal path connected between two conductors in said second transmission line and switchable between open circuit and short circuit conditions to either allow microwave signals to by pass said path or to be shorted therethrough, b. a first bistate voltage responsive capacitor connected in said first path and responsive to a control voltage for switching from one to another of its two substantially constant values of capacitance corresponding to high and low ranges of control voltage, thereby controlling the impedance state in (a) above, c. a second variable impedance signal path connected between two conductors in said third transmission line and switchable between open circuit and short circuit conditions to either allow microwave signals to bypass said path or be shorted therethrough, d. a second bistate voltage responsive capacitor connected in said second variable impedance signal path and responsive to a control voltage for switching from one to another of two substantially constant values of capacitance corresponding respectively to high and low ranges of control voltage, thereby controlling the impedance state in (c) above, and e. each of said first and second variable impedance signal paths includes an inductor serially connected with said bistate capacitor therein, whereby said bistate capacitor can be biased on and off series resonance with said inductor connected thereto to approximate either an open circuit or a short circuit condition for each of said variable impedance signal paths, and microwave signals propagated down said first transmission line may be diverted to either said second transmission line or to said third transmission line, depending upon the open or short circuit condition of each of said variable impedance signal paths, and said bistate capacitors conduct negligible current in either substantially constant capacitance state and the power required for switching said network and the distortion introduction in said microwave signals during switching are minimized.

8. The network defined in claim 7 wherein said second and third transmission lines are joined respectively to additional parallel transmission lines of differing lengths, whereby the switching or microwave signals, between said parallel transmission lines will introduce a delay in phase of signals arriving at a common output port of said parallel transmission lines

9. Microwave signal routing means including:

a. an input port joined to first and second output ports to which microwave signals from said input port are to be alternately routed, said input and output ports each including a pair of microwave conductors, and b. a voltage responsive variable capacitance device having two capacitance states for which the device capacitance is substantially invariant in separate predetermined voltage ranges and which is either zero biased or reverse biased in said ranges of control voltage, said variable capacitance device and a series resonant inductor serially connected across pairs of conductors in each of said first and second output ports and further connectable to control voltage terminals, whereby said variable capacitance device and said series inductor may be alternately biased to a series resonant condition to thereby provide a microwave short circuit in either one or the other of said first and second output ports and thereby cause microwave signals from said input port to be routed to the output port for which an RF open circuit obtains.

10. Signal routing means according to claim 9 wherein said variable capacitance device has a capacitance-voltage characteristic such that it has two substantially constant values of capacitance corresponding to predetermined ranges of control voltage, between which there is a capacitance transition region, whereby the variable capacitance device in each output port may be driven between its substantially constant capacitance values during the routing of microwave signals alternately to one and then the other of said first and second output ports.

11. Signal routing means according to claim 10 which further includes impedance means connected at a common node for said input and said first and second output ports and operative to resonate in parallel with either one or the other of the variable capacitance-inductance series networks, whereby said impedance means is operative to resonate in parallel with one of said series networks and thereby present negligible RF loading at said common node.

12. Microwave signal routing means according to claim 11 wherein:

a. said impedance means is a capacitor selected to resonate in parallel with the inductor of the series network which is anti-resonant, and b. each of said series networks including a decoupling capacitor connected between said control voltage terminal and one of said pairs of conductors in each output port for decoupling said control voltage therefrom.

* * * * *